United States Patent Office 3,422,115
Patented Jan. 14, 1969

3,422,115
PROCESS FOR PRODUCING 5-METHYLISOXAZOLE
Harry Allen Albrecht, Nutley, and John Thomas Plati, Rutherford, N.J., assignors to Hoffmann-La Roche Inc., Nutley, N.J., a corporation of New Jersey
No Drawing. Filed Feb. 14, 1966, Ser. No. 527,080
U.S. Cl. 260—307                                 5 Claims
Int. Cl. C07d 85/22

ABSTRACT OF THE DISCLOSURE

A process for preparing 5-methylisoxazole by reacting an alkali metal hydroxymethyleneacetone with a hydroxylamine acid salt in the absence of added acid is described. 5-Methyl-isoxazole is a useful intermediate for the preparation of $N^1$-(5-methyl-3-isoxazolyl)sulfanilamide, a known antibacterial agent.

---

This invention is concerned with an improved process for producing 5-methylisoxazole by the reaction of an alkali metal salt of hydroxymethyleneacetone with hydroxyliamine.

5-methylisoxazole, a useful intermediate for the preparation of the sulfa compound $N^1$-(5-methyl-3-isoxazolyl)-sulfanilamide, has been produced in the past by the reaction of an alkali metal salt of hydroxymethyleneacetone with a hydroxylamine acid salt in an acidic aqueous mixture, as is illustrated by the following equation for the reaction of sodium hydroxymethyleneacetone with hydroxylamine hydrochloride in concentrated hydrochloric acid:

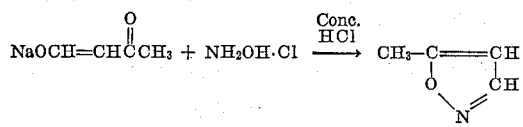

This method is not a particularly desirable route to 5-methyl-isoxazole, however, because the process also produces the 3-methylisoxazole isomer in fairly large amounts, often in a molar ratio with respect to the 5-isomer of about 1:2. In addition, this known process suffers from low yields of the combined isomers.

As an alternative, it has been proposed that the reaction be modified to produce first a "sesquioxime" followed by decomposition of the sesquioxime with acid, which is illustrated by the following two equations:

(a) 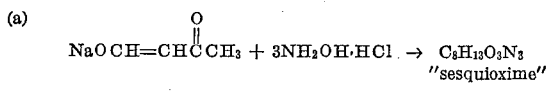

(b) 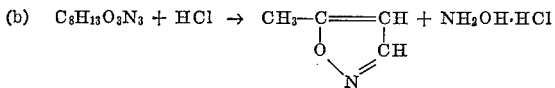

Although this process does improve the yield of 5-methyl-isoxazole, it still produces the 3-isomer in a ratio of about 1:7 of 3-isomer to 5-isomer. Furthermore, this process requires excess hydroxylamine for the production of the sesquioxime. This excess hydroxylamine, which is regenerated upon hydrolysis of the sesquioxime, must nevertheless be recovered and recycled to step (a) for an efficient process. Finally, this process requires that the sesquioxime be isolated before treatment with acid in step (b). As a result, this route is no more commercially attractive than the first-described process.

It has been discovered by this invention that the preferential formation of 5-methylisoxazole is promoted when the first-described reaction is conducted in the absence of added acid, i.e., when the reaction is conducted in an aqueous medium rather than in the presence of excess hydrochloric acid. It is believed that the presence of the additional acid favors the formation of 3-methylisoxazole.

It also has been found by this invention that improved yields of 5-methylisoxazole are obtained when the residence times of both the alkali metal hydroxymethyleneacetone and 5-methylisoxazole at elevated temperatures are reduced. In this aspect, it is preferred that the alkali metal salt of hydroxymethyleneacetone be added at a controlled rate to a refluxing reaction mixture containing hydroxylamine in the form of its acid addition salt while simultaneously removing a 5-methylisoxazole/water mixture. It is especially preferred that the rate of addition of the sodium salt be such that neither the sodium salt nor 5-methylisoxazole is present in the reaction mixture in significant amounts. This condition is readily determined by observation of the boiling point of the mixture, which should be at least 90° C. and preferably in the range of 94–96° C. If the boiling point is below 90° C., the concentration of alkali metal hydroxymethyleneacetone or 5-methylisoxazole is too high and reduced yields of 5-methylisoxazole result.

It is preferred that the reaction be conducted by addition of an aqueous solution of the alkali metal hydroxymethyleneacetone to an aqueous solution of the hydroxylamine salt. The addition of the sodium salt in aqueous solution is preferred to enable adequate control of the rate of addition of the sodium salt. The concentrations of alkali metal salt and hydroxylamine in their respective solutions are not narrowly critical, although ratios of from 0.5 to about 1.5 grams of alkali metal salt or hydroxylamine per milliliter of water are preferred.

The process of this invention may be conducted in a batchwise or continuous manner. When the process is conducted batch-wise, it is preferred that on completion of the addition of sodium hydroxymethyleneacetone, the molar ratio of the alkali metal salt to hydroxylamine be approximately 1:1. Higher or lower ratios may be employed if desired, but no advantage is obtained thereby.

The hydroxylamine, as indicated above, is employed in the form of a stable acid salt, such as its hydrochloride salt or sulfate salt. When the hydroxylamine is employed as the salt of a polybasic acid such as sulfuric acid, it is preferred to partially neutralize the hydroxylamine solution before addition of the sodium hydroxymethyleneacetone so that upon completion of the addition of the alkali metal salt, the acid component is completely converted to an inorganic salt. The pre-neutralization may be effected with any inorganic base, for example, sodium hydroxide, potassium hydroxide, calcium hydroxide, aluminum hydroxide, and the like.

When the process of this invention is conducted in a batchwise manner, it is perferred to continue the boiling of the reaction mixture after completion of the addition of the alkali metal hydroxymethyleneacetone and to continue removing the distillate until the reaction temperature has increased to about 100° C. This additional reaction time is employed to insure substantially complete reaction.

The distillate formed during the reaction is condensed and cooled, preferably to about room temperature, and the 5-methylisoxazole recovered therefrom by conventional techniques. For example, the aqueous distillate may be saturated with salt and the 5-methylisoxazole extracted with an organic solvent. Suitable solvents include ethers, such as diethyl ether, and chorinated hydrocarbons, such as methylene chloride. The organic extracts are then fractionated to recover 5-methylisoxazole.

The following examples are illustrative.

EXAMPLE 1

To a stirred suspension of 54 grams of sodium methoxide in 2 liters of ether under an atmosphere of nitrogen was added a solution of 58 grams of acetone and 74 grams of ethyl formate. The reaction mixture was held overnight at room temperature with stirring and under a nitrogen atmosphere. The insoluble sodium hydroxymethyleneacetone which had formed, after filtration from the reaction mixture, washing with ether, and drying in a vacuum desiccator, weighed 100.5 grams.

The sodium hydroxymethyleneacetone was then dissolved in 100 milliliters of water and the resulting solution added over a 30-minute period to a solution of 65.1 grams of hydroxylamine hydrochloride in 65 milliliters of water while steam distilling the reaction mixture. After an additional 10 minutes of steam distillation, the two-phase distillate was saturated with sodium chloride and extracted with three 50-milliliter portions of ether. The combined ether extracts were dried over sodium sulfate and then distilled to obtain the following fractions:

| Fraction | B.P., ° C. | Vol. or Wt. | Percent of 5-methylisoxazole * (approx.) |
|---|---|---|---|
| 1 | 36–55 | 130 ml | 1 |
| 2 | 55–105 | 15 ml | 18 |
| 3 | 105–120 | 6 ml | 83 |
| 4 | 121–123 | 42.4 g | 99 |

*By vapor phase chromatography.

The total contained 5-methylisoxazole in fractions 1–4 represents a 6 6percent yield based upon sodium hydroxymethyleneacetone.

EXAMPLE 2

To a stirred suspension of 54 grams of sodium methoxide in 500 milliliters of methylene chloride was added dropwise 60 grams of methyl formate over 30 minutes while maintaining the temperature at 25–30° C. After an additional 10 minutes, 87 grams of acetone was added dropwise over 30 minutes, and the resulting reaction mixture maintained at 25–30° C. overnight. The mixture then was admixed with 100 milliliters of water to dissolve the sodium hydroxymethyleneacetone which had precipitated, the aqueous and organic layers were separated, and the methylene chloride layer was washed three times with 50-milliliter portions of water.

The combined aqueous phases were added dropwise to a boiling solution of 141 grams of hydroxylamine acid sulphate in 200 milliliters of water, which had been partially neutralized with a slurry of 37 grams of calcium hydroxide in 50 milliliters of water. The sodium salt was added at a rate sufficient to maintain the reaction temperature at about 96° C., and the vapors were withdrawn as they were formed and condensed. Distillation was conducted until the vapor temperature reached 100° C., at which time a total of 600 milliliters of distillate had been collected. The distillate was saturated with 150 grams of sodium chloride and then extracted with four 100-milliliter portions of methylene chloride. The extracts were combined and fractionated at atmospheric pressure, yielding a fraction boiling between 116–122° C., which weighed 60.8 grams and contained 92 percent of 5-methylisoxazole. The yield was 67.5 percent based on methyl formate.

After three repetitions of the above procedure, the average yield of pure 5-methylisoxazole was 66.8 percent; the average analysis of the 116–122° C. fraction was 92 percent of 5-methylisoxazole, 3 percent 3-methylisoxazole, and 5 percent mesityl oxide. The mesityl oxide results from the self-condensation of acetone during the preparation of the sodium hydroxymethyleneacetone.

We claim:

1. In a process for the production of 5-methylisoxazole by the reaction of an alkali metal hydroxymethyleneacetone with a hydroxylamine acid salt, the improvement of effecting said reaction by adding an aqueous solution of alkali metal hydroxymethyleneacetone in the absence of added acid to a boiling reaction mixture containing aqueous hydroxylamine acid salt and simultaneously distilling the reaction mixture.

2. The process as claimed in claim 1 wherein the boiling reaction mixture is at a temperature of at least 90° C.

3. The process as claimed in claim 2 wherein said temperature is about 94–96° C.

4. A process in accordance with claim 3, wherein the alkali metal hydroxymethyleneacetone is sodium hydroxymethyleneacetone.

5. A process in accordance with claim 4, wherein the hydroxylamine acid salt is hydroxylamine hydrochloride.

References Cited

Wiley: Heterocyclic Compounds, 1962, p. 55.
Claisen: Chem. Abstracts, vol. 3 (1909), p. 889.

NICHOLAS S. RIZZO, *Primary Examiner.*

R. J. GALLAGHER, *Assistant Examiner.*